United States Patent
Hur et al.

(10) Patent No.: US 11,264,637 B2
(45) Date of Patent: *Mar. 1, 2022

(54) BATTERY SYSTEM AND PRODUCTION METHOD

(71) Applicant: Millibatt, Inc., Los Angeles, CA (US)

(72) Inventors: Janet Hur, Los Angeles, CA (US); Leland Smith, Los Angeles, CA (US); Cheolwoong Lim, Anyang-si (KR); Guangyi Sun, Tianjin (CN)

(73) Assignee: Millibatt, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,675

(22) Filed: Sep. 1, 2020

(65) Prior Publication Data

US 2020/0403268 A1 Dec. 24, 2020

Related U.S. Application Data

(63) Continuation of application No. 16/247,466, filed on Jan. 14, 2019, now Pat. No. 10,797,342, which is a
(Continued)

(51) Int. Cl.
*H01M 10/0525* (2010.01)
*H01M 4/133* (2010.01)
(Continued)

(52) U.S. Cl.
CPC ..... *H01M 10/0525* (2013.01); *H01M 4/0407* (2013.01); *H01M 4/13* (2013.01); *H01M 4/133* (2013.01); *H01M 4/139* (2013.01); *H01M 4/661* (2013.01); *H01M 4/663* (2013.01); *H01M 10/0436* (2013.01); *H01M 10/052* (2013.01); *H01M 10/0565* (2013.01); *H01M 10/0585* (2013.01); *H01M 10/482* (2013.01); *H01M 50/183* (2021.01); *H01M 50/691* (2021.01);
(Continued)

(58) Field of Classification Search
CPC .......... H01M 10/0525; H01M 10/052; H01M 10/0565; H01M 10/0585; H01M 10/482; H01M 50/183; H01M 50/691; H01M 4/0407; H01M 4/13; H01M 4/133; H01M 4/139; H01M 4/661; H01M 4/663
See application file for complete search history.

(56) References Cited

U.S. PATENT DOCUMENTS

| | | | | |
|---|---|---|---|---|
| 6,495,283 B1 * | 12/2002 | Yoon | ................ | H01M 10/0436 429/162 |
| 2007/0134549 A1 * | 6/2007 | Nathan | ............. | H01M 10/0525 429/149 |
| 2009/0170001 A1 * | 7/2009 | Roozeboom | ...... | H01M 10/0562 429/225 |

* cited by examiner

*Primary Examiner* — Jimmy Vo
(74) *Attorney, Agent, or Firm* — Run8 Patent Group, LLC; Peter Miller

(57) ABSTRACT

One variation of a battery unit includes: a substrate including silicon and defining a cell, wherein the cell includes a base encompassed by a continuous wall and a set of posts extending normal to the base; an electrolyte material coating vertical surfaces of each post, in the set of posts, and vertical surfaces of the continuous wall in the cell; a cathode material filling the cell over the electrolyte material, between posts in the set of posts, and between the set of posts and the continuous wall; a seal extending along a top of the continuous wall; and a cathode current collector bonded to the seal, electrically coupled to the cathode material, and cooperating with the substrate to enclose the cell to form a single-cell battery.

20 Claims, 6 Drawing Sheets

Related U.S. Application Data continuation of application No. 15/926,422, filed on Mar. 20, 2018, now Pat. No. 10,218,031.

(60) Provisional application No. 62/473,614, filed on Mar. 20, 2017.

(51) Int. Cl.
*H01M 4/66* (2006.01)
*H01M 10/48* (2006.01)
*H01M 4/139* (2010.01)
*H01M 4/04* (2006.01)
*H01M 10/052* (2010.01)
*H01M 10/04* (2006.01)
*H01M 10/0565* (2010.01)
*H01M 4/13* (2010.01)
*H01M 10/0585* (2010.01)
*H01M 50/183* (2021.01)
*H01M 50/691* (2021.01)
*H01M 4/02* (2006.01)

(52) U.S. Cl.
CPC ................. *H01M 2004/027* (2013.01); *H01M 2004/028* (2013.01)

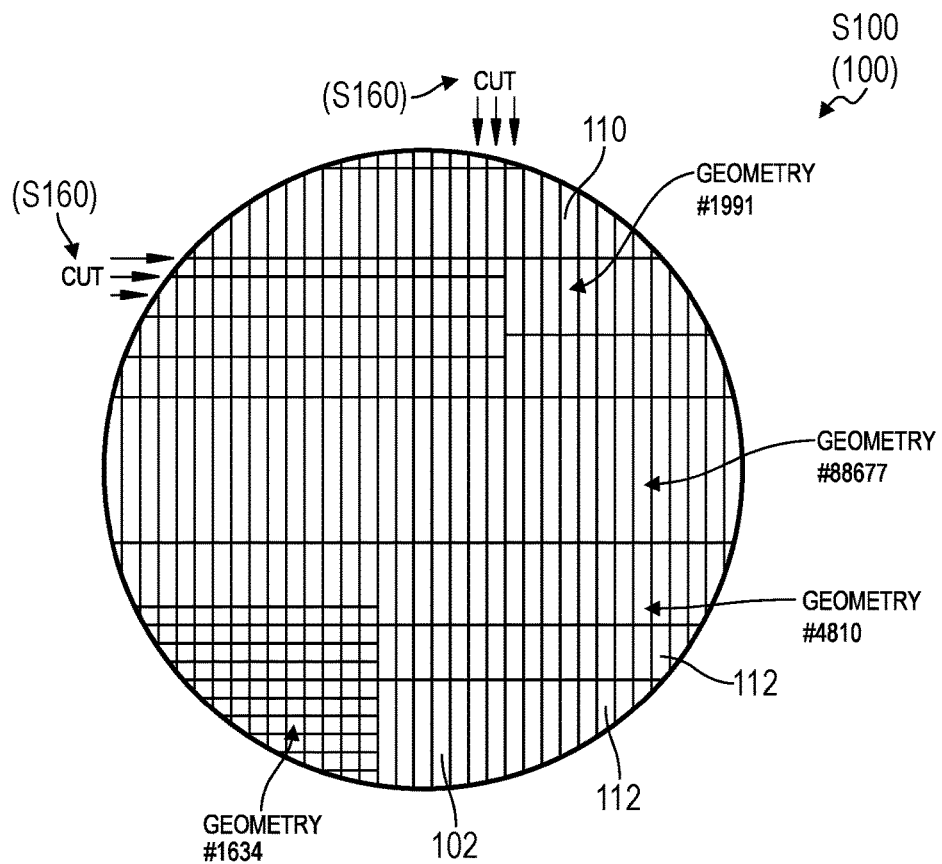
*FIG. 2*
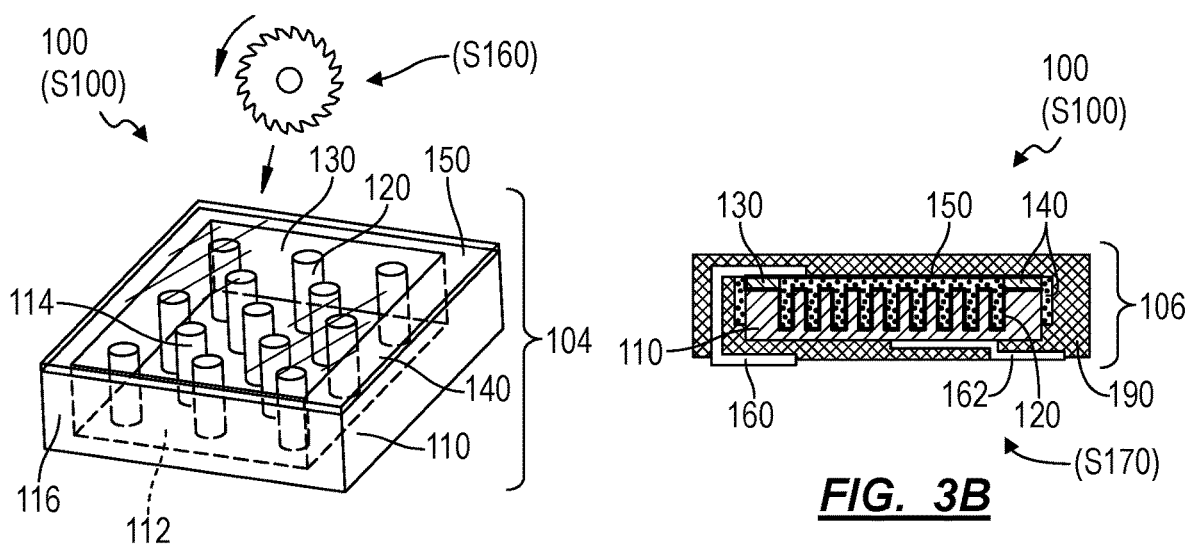
*FIG. 3A*  *FIG. 3B*

BATTERY SYSTEM AND PRODUCTION METHOD

CROSS-REFERENCE TO RELATED APPLICATIONS

This application is a continuation application of U.S. patent application Ser. No. 16/247,466, filed on 14 Jan. 2019, which is a continuation application of U.S. patent application Ser. No. 15/926,422, filed on 20 Mar. 2018, which claims the benefit of U.S. Provisional Application No. 62/473,614, filed on 20 Mar. 2017, each of which is incorporated in its entirety by this reference.

TECHNICAL FIELD

This invention relates generally to the field of battery technologies and more specifically to a new and useful battery system and production method in the field of battery technologies.

BRIEF DESCRIPTION OF THE FIGURES

FIG. 2 is a schematic representation of one variation of the battery system;

FIGS. 3A and 3B are schematic representations of one variation of the battery system and method;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Battery System and Method

Figure 1:
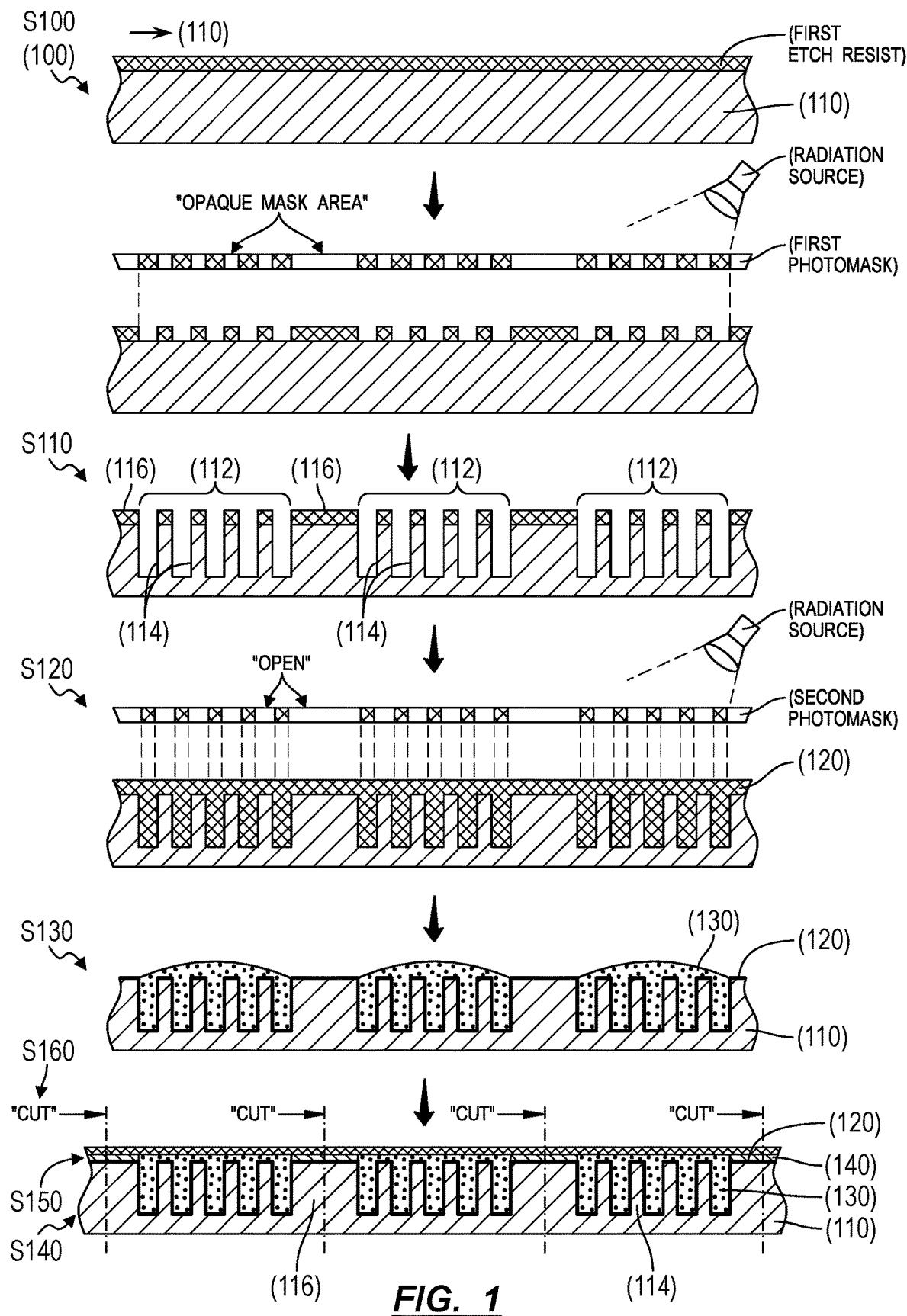
FIG. 1 is a flowchart representation of a battery system and method.

As shown in FIGS. 1, 3A, and 3B, a battery system 100 includes: a substrate 110 including silicon and defining a set of cells, wherein each cell 112 in the set of cells includes a base encompassed by a continuous wall 116 and a set of posts extending normal to the base; an electrolyte material 120 coating vertical surfaces of each post and vertical surfaces of the continuous wall 116 in each cell 112 in the set of cells; a cathode material 130 filling each cell 112, in the set of cells, over the electrolyte material 120; a seal 140 extending along a top of the continuous wall 116 of each cell 112 in the set of cells; and a cathode current collector 150 bonded to the seal 140, electrically coupled to the cathode material 130, and cooperating with the substrate 110 to enclose each cell 112, in the set of cells, to form a multi-cell 112 assembly; wherein the multi-cell 112 assembly is dividable along continuous walls between adjacent cells, in the set of cells, to form a set of discrete single-cell 112 batteries.

As shown in FIGS. 1 and 2, a method S100 for fabricating a battery includes: etching a substrate 110 including silicon to form a set of cells in Block S110, each cell 112 in the set of cells including a base encompassed by a continuous wall 116 and a set of posts extending normal to the base; coating vertical surfaces of posts in each cell 112, in the set of cells, with an electrolyte material 120 in Block S120; depositing a cathode material 130 into each cell 112, in the set of cells, around the set of posts in the cell 112 in Block S130; applying a seal 140 along a top of the continuous wall 16 encompassing each cell 112 in the set of cells in Block S140; installing a continuous cathode current collector 150 panel over the substrate 110, bonded to the seal 140, and contacting the cathode material 130 in each cell 112, in the set of cells, to form a multi-cell 112 assembly in Block S150; and dissecting the multi-cell 112 assembly along the continuous wall 116 of each cell 112, in the set of cells, to form set of discrete single-cell 112 batteries in Block S160.

As shown in FIG. 3B, the method S100 can further include, for one battery separated from the multi-cell 112 assembly: connecting surface-mount-technology (or "SMT") leads to a segment of the substrate 110 and to a segment of the cathode current collector 150 contained in the battery; and encasing the battery in a potting material 190 to form a surface-mount battery in Block S170.

2. Applications

The method S100 can be executed to fabricate a multi-cell assembly 102 over a silicon wafer and to separate (or "dissect") this multi-cell assembly 102 into multiple discrete, "three-dimensional" batteries, as shown in FIGS. 3A and 3B.

2.1 Standard Bulk Micro-Machining and Photolithography Processes

Generally, the method S100 can be executed to rapidly (e.g., within days) fabricate a limited number (e.g., 1) or even high volumes (e.g., millions) of units of a custom battery geometry by: creating a limited number of simple "soft" tools (i.e., optical masks); implementing bulk micro-machining and photolithography processes to construct a multi-cell assembly 102 over a silicon wafer; and then implementing wafer processing procedures to dice the multi-cell assembly 102 into multiple discrete, sealed, single-cell batteries and to package these discrete batteries. Therefore, the method S100 can be implemented to create a battery of custom geometry (e.g., size, shape, and/or capacity) with limited upfront tooling cost, minimal assembly line reconfiguration, and therefore minimal lead-time. Furthermore, the method S100 can be implemented to fabricate units of multiple unique battery geometries on a single silicon wafer, thereby distributing costs for low-volume production of custom batteries across multiple unique battery geometries.

Figure 6:
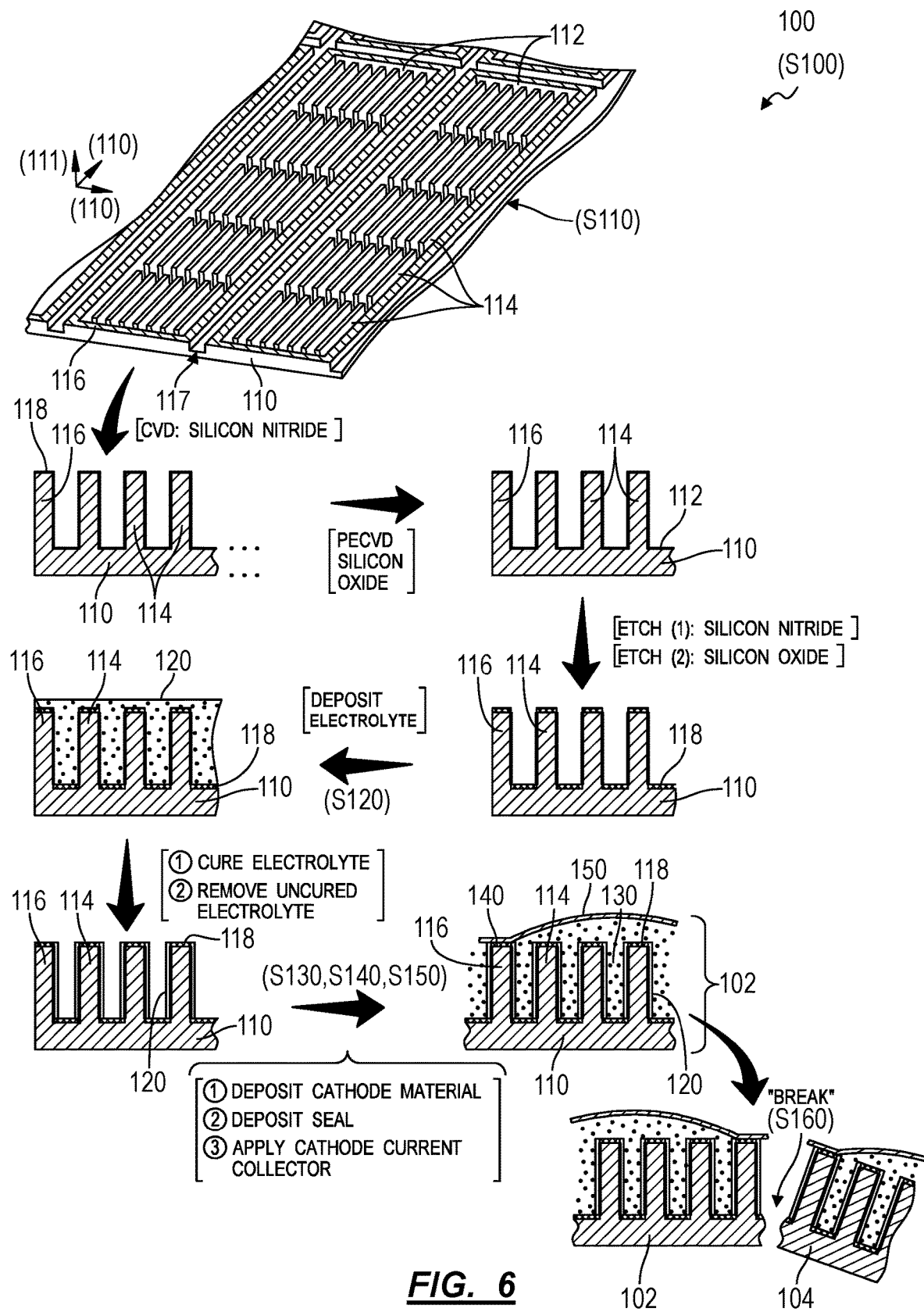
FIG. 6 is a schematic representation of one variation of the battery system and method.
Figure 7:
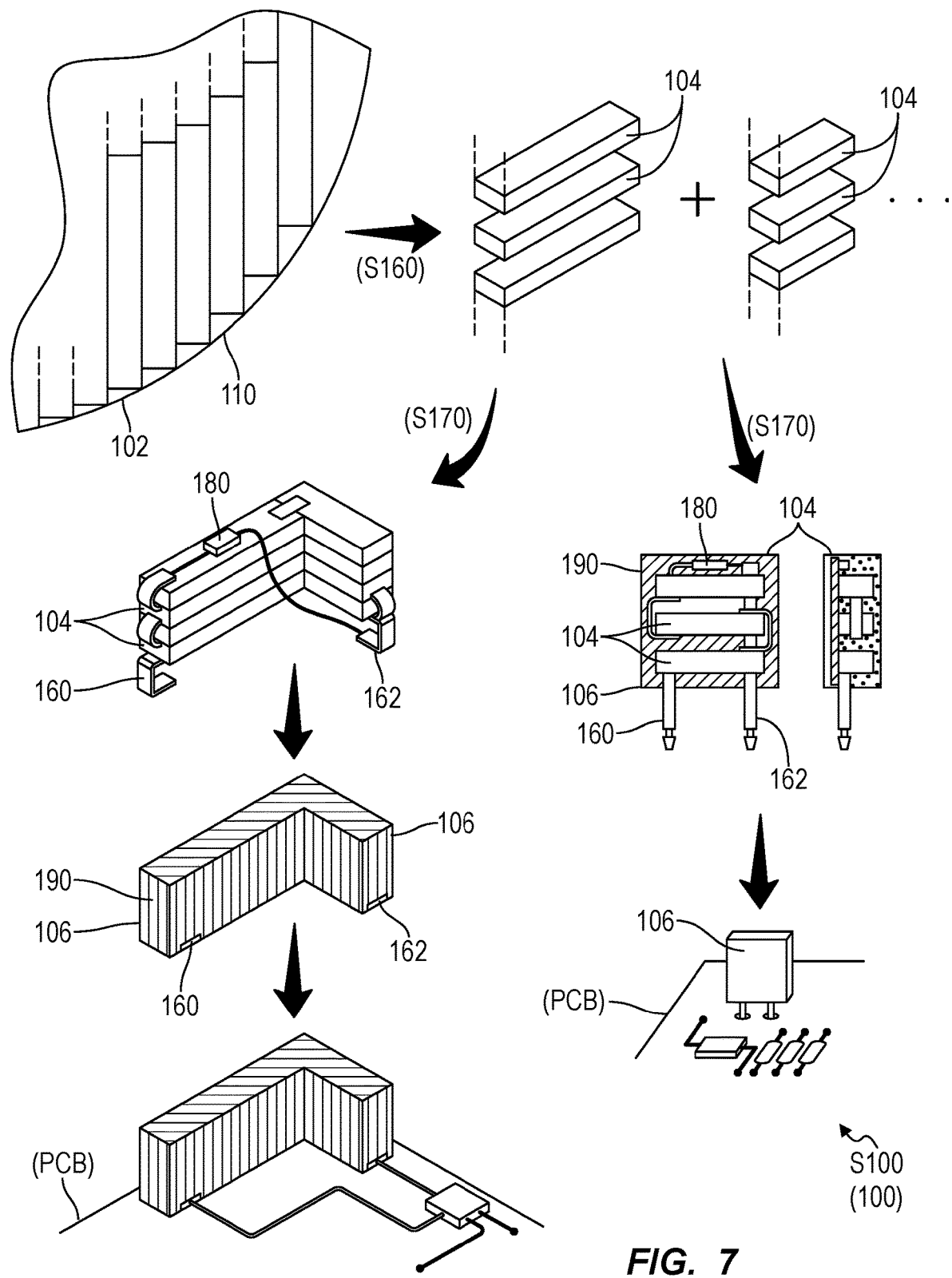
FIG. 7 is a schematic representation of one variation of the battery system and method.

For example, existing bulk micro-machining and photolithography techniques can be implemented according to the method S100 to transform one 8"-diameter silicon wafer into a multi-cell assembly 102, as shown in FIGS. 2, 6, and 7. Many (e.g., hundreds of) discrete, sealed, single-cell batteries can then be separated from the multi-cell assembly 102 via existing wafer processing techniques, as shown in FIG. 2. Each battery can then be encased in an SMT or through-hole package, as shown in FIGS. 3B and 7, for installation directly onto a printed circuit board (or "PCB"). In this example, this SMT or through-hole battery can be adhered to a PCB—along with other circuit components—with solder paste and then passed through a reflow oven to fix both circuit components and the battery to the PCB, thereby completing the PCB in a single pick-and-place and reflow cycle rather than necessitate later, lower-temperature installation of a battery on the PCB.

2.2 Battery Performance

The method S100 can also be executed to fabricate multiple discrete battery cells 104 on a silicon wafer such that a crystalline structure of the silicon wafer is preserved (at least to some degree) in each discrete battery cell 104 even after the silicon wafer is dissected and these discrete battery cells 104 are separately packaged and then charged. In particular, the method S100 can be executed to control geometry and composition of each battery cell 104 fabricated on the silicon wafer in order to limit expansion of the segment of the silicon wafer that forms the anode in a battery cell 104 due to lithium ion transport into the anode when the cell is charged, thereby reducing stress on the anode, reducing likelihood of fracture in the anode, and preserving performance of the battery cell 104 over many charge/discharge cycles. For example, a target volume of dry cathode material—which includes a controlled proportion of lithium-storing material (hereinafter "active lithium")—can be dispensed into each cell in the silicon wafer with a high-volatility processing solvent and the processing solvent can be evaporated entirely from each cell to yield a controlled total amount (or controlled total proportion) of active lithium in each cell, which may limit expansion of the anode due to lithium ion transport into the anode to less than 25% as the battery cell 104 is charged.

In particular, net movement of lithium ions within a battery cell fabricated according to the method S100 may occur between: the silicon-based substrate that defines an anode; and active lithium that is originally contained within the cathode material that is deposited and cured within a cell over the anode. Transport of lithium ions from the cathode into the anode may cause the anode to expand (or "swell"). Given the cathode and anode are inter-digitated in this 3D battery cell, total volume expansion (y) of the anode may therefore be a function of the total amount of active lithium in the cathode, which may be proportional to a total volume of cathode material in the battery cell and therefore proportional to a pitch distance between adjacent anode posts (p), negatively proportional to a thickness of the electrolyte coating between anode posts and the cathode (t), and inversely proportional to a width of each anode post (w), such as according to the function:

$$y = c\left(\frac{p-t}{w} - 1\right).$$

The geometry of the anode, the thickness of the electrolyte, and the proportion of active lithium in the cathode material can therefore be configured to limit total volume expansion of the anode by lithium ion transport from the cathode into the anode when a battery cell is charged, such as to less than a total volume expansion of 25%, which may improve crystalline stability of the anode during many charge/discharge cycles over time.

The method S100 can also be implemented to fabricate multiple battery cells 104—on a single silicon wafer—that leverage directional properties of the silicon wafer to achieve both strong battery performance (e.g., low internal impedance, low self-discharge characteristics, rapid charge/discharge, high capacity per unit volume, high efficiency, etc.) and high yield. For example, multiple three-dimensional cells can be fabricated on a single silicon wafer according to the method S100, wherein each cell includes multiple parallel and offset rectangular posts rising above its base and wherein the broad (i.e., large) faces of each post extend along to the {110} crystalline plane of the silicon wafer, which may be (significantly) more permeable to lithium ions than other crystalline orientations of mono-crystal silicon and thus yield improved battery performance. In this example, other surfaces within a cell—such as the base of each cell and the tops of walls that encompass these cells—may be non-parallel to the {110} crystalline plane of the silicon wafer and may exhibit less permeability to lithium ions; these surfaces in each cell can therefore be passivated according to the method S100 in order: to form a consistent barrier (e.g., a passivated layer 118) between the anode and cathode material in the cell to prevent shorting; and to simplify fabrication of electrolyte material over the posts, thereby increasing battery yield per silicon wafer while also limiting impact on immediate performance of these battery cells 104—once dissected from the silicon wafer—due to obscuration of surfaces of the anode.

Therefore, the method S100 can be executed to fabricate a battery assembly—including many discrete cells—on one mono-crystal silicon wafer. This silicon wafer can then be diced according to the method S100 to form many discrete, millimeter-scale, three-dimensional, single-cell batteries that exhibit strong and consistent performance characteristics over repeated charge/discharge cycles.

3. Anode

The multi-cell 112 assembly includes a substrate 110 of silicon and defining a set of cells, wherein each cell 112 in the set of cells includes a base encompassed by a continuous wall 116 and a set of posts extending normal to the base. Generally, the substrate 110 includes a layer of anode material (e.g., mono-crystal silicon) into which multiple discrete cells—each containing multiple anode posts 114 encompassed by a continuous wall 116—are formed through selective removal of anode material. In particular, many cells can be fabricated from a singular substrate 110 (e.g., a mono-crystalline silicon wafer) through selective removal of volumes of the substrate 110—such as via bulk micromachining or other stereo lithography techniques—according to the method S100 to form a set of cells directly in the substrate 110, wherein each cell 112 includes multiple anode posts 114 extending from a base of the cell 112 (e.g., an "anode current collector") and bounded on all sides by a wall 116. Each cell 112 is later coated with electrolyte material, loaded with cathode material, and then covered with a cathode current collector to form a single-cell battery within the greater multi-cell 112 assembly.

3.1 Silicon Wafer

In one implementation, the substrate 110 includes a mono-crystal silicon wafer, such as a silicon wafer 4", 6", or 8" in diameter. In this implementation, the substrate 110 can include a p-type or n-type silicon wafer, which may support greater charge propagation through the anode posts 114 and anode current collector—formed in the substrate 110—in a resulting battery cell 104. For example, the silicon wafer can be doped with boron, aluminum, arsenic, or antimony, etc. to improve charge propagation through the anode posts 114 and through the anode current collector across the base of the substrate 10.

3.2 Etching the Wafer

Block S110 of the method S100 recites etching a substrate 110 including silicon to form a set of cells, wherein each cell 112 in the set of cells includes a base encompassed by a continuous wall 116 and a set of posts extending normal to the base. Generally, in Block S110, the substrate 110 can be processed to form multiple discrete cells—separated by continuous walls and saw streets that bound the bases and sets of anode posts 114 in each cell 112—directly in one side of the substrate 110.

In one implementation, in preparation for etching cells and posts into the substrate 110, a first optical mask (e.g., a "photomask" or "photoreticle") is fabricated, wherein the first optical mask defines mask areas (e.g., opaque regions) over designated locations of each post and over designated locations of each wall 116. For example, the first optical mask can include a transparent fused silica blank coated with a UV-absorbing film extending over designated anode post and wall areas but excluded from each designated cell 112 area. In this example, the chrome metal-absorbing film can define: a set of rectangular mask areas (i.e., coated rectangular areas to yield rectangular anode posts 114), each mask area aligned (e.g., coaxial) with its corresponding post location and of a geometry approximating a target geometry of a corresponding post for each post in each cell 112 in the set of cells designated for etching into the substrate 110; and a set of rectilinear mask areas, each extending up to designated edges of walls around each cell 112 in the set of cells; (or a similar geometry scaled up, such as by a ratio of 4:1, over final feature dimensions of the cells, posts, and walls).

Figure 4:
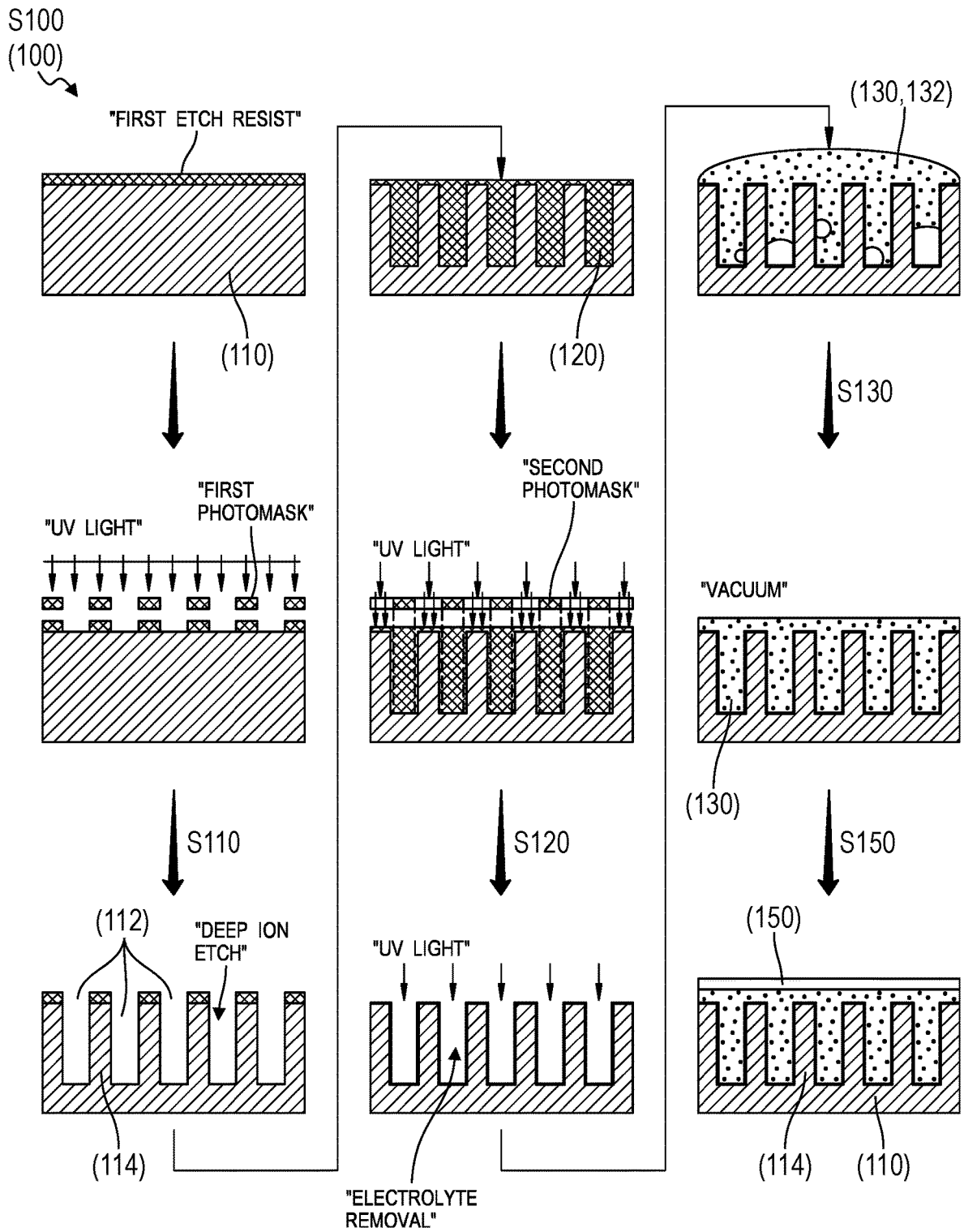
FIG. 4 is a flowchart representation of one variation of the method.

Once the first photomask is prepared, the top surface (e.g., the polished face) of the substrate 110 is coated with a layer of etch resist, such as a photo-curable (e.g., "photosensitive") positive-tone etch resist that cures when exposed to radiation (e.g., UV light). For example, the layer of etch resist can be applied to the substrate 110 (e.g., by spray-coating or dip-coating) and then prebaked. The first photomask is then arranged and aligned to the substrate 10; the layer of etch resist is exposed to radiation through the first photomask in order to selectively degrade the etch resist outside of the designated post and wall locations, as shown in FIGS. 1 and 4.

(Alternatively: the first optical mask can define windows (or "opens") over designated anode post and wall locations for the substrate 110; negative-tone etch resist can be selectively cured over the designated post and wall locations across the substrate no with this first optical mask; and uncured etch resist can be removed from the substrate 110.)

Furthermore, a hard etch mask (e.g., a silicon oxide SiO2 etch mask) can be similarly patterned across the substrate 110 by the layer of etch resist in preparation for deep reactive ion etching of the substrate 110.

A deep reactive ion etching (e.g., "DRIE") process can then be implemented to remove material from the substrate 110 where not masked by the etch resist. Once this deep etching process is complete and the layer of etch resist is removed, the remaining substrate 110 defines multiple empty cells of anode material (e.g., mono-crystal doped silicon), wherein each cell 112 is bounded on all sides by a continuous wall 116 and contains a set of posts that extend approximately up to the top of the adjacent wall 116($s$).

Therefore, etching the substrate 110 in Block Silo can include: fabricating an anode mask defining a rectangular opaque mask area at a location of each post in the set of posts in each cell 112 in the set of cells; depositing etch resist across a top surface of the silicon wafer; arranging the anode mask over the substrate 110 with long edges of rectangular windows in the anode mask parallel to a {110} plane of a crystalline structure of the silicon wafer; exposing the substrate 110 to electromagnetic radiation through the anode mask to selectively degrade the etch resist on the top surface of the substrate 110 at locations outside of each post in the set of posts in each cell 112 in the set of cells; etching the top surface of the substrate 110 to form each cell 112, each post in a cell 112 in the set of cells defining a rectangular cross-section extending upwardly from a base of the cell 112 and defining opposing broad faces parallel to the {110} plane of a crystalline structure of the silicon wafer; and removing cured resist from the substrate 110.

3.3 Post Geometry: Rectangular Cross-Section

In one implementation shown in FIG. 6, each post—in the set of posts within a single cell 112 in the set of cells formed in the substrate 110—defines a rectangular cross-section that: extends upwardly from a base of the cell 12; and includes opposing broad faces that extend perpendicular to the base of the cell 112 and parallel to a {110} plane of a crystalline structure of the substrate 110. Generally, mono-crystal silicon may exhibit greatest permeability to lithium ions through faces parallel to the {110} planes of its crystal lattice. Therefore, to maximize speed and efficiency of lithium ion transport between a post within a battery cell 104 fabricated from a mono-crystal silicon wafer according to the method S100, each post can define a rectangular cross-section in which the long faces (or all faces) of each post extend approximately parallel to a {110} plane of the crystalline structure of the substrate 110, as shown in FIGS. 1 and 6.

Furthermore, a cell 112—fabricated in the substrate 110 according to Block Silo of the method S100—can contain multiple parallel and offset posts bounded within one continuous wall 116 such that parallel broad faces of each of these posts extend parallel to the {110} plane(s) of the crystalline structure of the substrate 110. The anode surface area parallel to the highly lithium-permeable {110} plane—thus defined by the broad faces of these anode posts 114 within this cell 112—can therefore significantly exceed the area of secondary surfaces parallel to less lithium-permeable planes within the cell 112, such as the base of the cell 112 that is parallel to the {111} plane of the crystalline structure of the substrate 110.

As described below, these secondary surfaces—such as the base of the cell 112, the tops of the posts, and the top of the continuous wall 116 surrounding the cell 112—can be coated with a dielectric material or otherwise passivated in order to retard lithium transport through these secondary surfaces. However, because these secondary surfaces are generally less permeable to lithium ion transport than the broad faces of the posts, such dielectric coating or other passivated layer 118 may minimally affect performance of the resulting battery cell 104 while also simplifying fabrication of the electrolyte coating, improving electrical isolation of the substrate 110 and cathode material, and increasing yield.

The crystalline structure of the substrate 110 may also yield slower transport of lithium ions vertically downward into the base of the cell 112 normal to the {100} plane than transport of lithium ions from the electrolyte material into the broad faces of the anode posts 114 normal to the {110} plane. The posts and the base of the cell 112 can therefore be oriented to decouple lithium ion transport into the posts from electron flow into the anode current collector during a charge cycle, thereby: limiting swelling of the base of the substrate 110 (i.e., the anode current collector) when the battery cell 104 is charged; improving stability of the structure of the battery cell 104 through charge/discharge cycles; and enabling the posts to separately swell as lithium ions are transported therein when the resulting battery cell 104 is charged.

Furthermore, to relieve stress in such a post within a cell 112 due to swelling when the resulting battery cell 104 is charged, the post can be segmented (e.g., "split") along its long axis, thereby enabling each segment of the post to swell or otherwise move substantially independently of other segments of the post. For example, each post—within a set of posts within a cell 112—can: define a rectangular cross-section defining a principle axis parallel to a long axis of the cell 112 and parallel to the {110} plane of the crystalline structure of the substrate 110; include opposing broad faces that extend parallel to the principle axis; and be segmented along the principle axis. In this example, the post can extend approximately 500 microns above the base of the cell 112 and can be segmented at intervals of approximately 1000 microns along the principle axis, such as with a 50-micron gap between opposing faces of adjacent segments of the post, such as shown in FIG. 6. Therefore, segments of each post with a battery cell 104 may expand, contract, and sway independently during charge and discharge cycles due to lithium ion conduction into and out of these posts, thereby limiting peak stress within each post segment that may otherwise cause fatigue and eventual fracture of these posts from the anode current collector below and thus extending a useful life and/or performance of the battery cell 104.

3.4 Post Geometry: Round and Polygonal Cross-Section

In another variation, the set of cells is etched into the substrate 110 with posts that define round or polygonal cross-sections. For example, the top face of the substrate 110 can be parallel to a {111} plane (or parallel to a {100} plane) of the mono-crystal silicon wafer. In this example, cells can be etched into the top face of the substrate 110, including hexagonal posts defining faces that are parallel to the {110} planes of the substrate 110 and such that the base of each cell 112 is parallel to the {111} plane of the substrate 110 (or parallel to the {100} plane of the substrate 110).

Alternatively, each cell 112 can include a set of cylindrical posts—which may approximate hexagonal posts—as shown in FIG. 3A.

3.5 Cell Perimeter Geometry

In one variation shown in FIG. 6, the substrate 110 is also etched between opposing walls encompassing adjacent cells to form a (deep) valley 117 between these adjacent cells in Block Silo. For example, a valley 117 centered between opposing walls encompassing adjacent cells can be etched concurrently with these cells down to a depth substantially similar to the depths of these cells.

Once the electrolyte material, cathode material, seal, and cathode current collector are fabricated over these cells in subsequent Blocks of the method S100, the cathode current collector can be mechanically perforated, laser ablated, or otherwise removed over these valleys 117 between adjacent cells, and these cells can be separated from the substrate major by breaking the substrate 110 along these valleys 117.

However, the substrate 110 can be etched in any other way in Block Silo to define a set of cells delineated by continuous walls and including posts of any other shape or geometry.

4. Electrolyte

As shown in FIGS. 1, 4, 5, and 6, the multi-cell assembly 102 includes electrolyte material 120 coating vertical surfaces within each cell. Generally, the electrolyte layer functions: to conduct lithium ions between the anode posts and the cathode material to facilitate chemical reactions between the anode posts and cathode material that deliver energy to an external circuit. The electrolyte layer also functions as a buffer between anode posts and cathode material to prevent flow of electrons between the anode posts and the cathode material inside the battery.

The electrolyte layer can define a thin film of approximately uniform thickness (e.g., approximately 10 microns) that covers the bottom of each cell, the sides and tops of each post, and the sides and tops of each wall. In particular, the electrolyte layer can be of at least a minimum thickness (e.g., 1 micron) across the cells, walls, and posts in order: to prevent immediate shorting between the substrate (i.e., the anode) and cathode material deposited into the cell in Block S130; and to prevent shorting between the cathode and "dendrites" that may grow from the posts and walls of the substrate through the electrolyte layer toward cathode over the course of multiple charge/discharge cycles of a battery cell 104 dissected from the multi-cell assembly 102.

4.1 Electrolyte Material and Properties

Generally, once cured, the electrolyte material 120 may exhibit a relatively high density of contiguous voids (or "open-cell pores") between the anode (i.e., the posts, interior faces of the continuous walls, and the base) of a cell and cured (or "hardened," "processed") cathode material within the cell. Such contiguous voids may support high conductivity (or permeability) to lithium ions flowing between the anode and the cathode. In particular, cured electrolyte material 120 can: define a dense network of pores that exhibits a controlled distribution of cross-sectional areas and that exhibits low resistance to rapid transport of solvated ions (e.g., lithium ions) between the anode and the cathode while preventing progression of other particles in the cathode through the electrolyte into the anode and vice versa; and exhibit high electrical resistivity. For example, the electrolyte material 120 can: yield low internal resistance in the battery, thus permitting high power densities; while also yielding high electronic resistance, which reduces self-discharge rate and enhances charge retention in the battery cell 104.

In an uncured state, the electrolyte material 120 can include: a photocatalyst configured to activate in the presence of electromagnetic radiation (e.g., UV light); a monomer configured to crosslink to form a resilient, electrically-insulative structure in the presence of activated photocatalyst; a primary solvent configured to dissolve the monomer; and a polymer that is semi-miscible in the monomer and configured to phase separate in the monomer such that, when the monomer crosslinks in the presence of activated photocatalyst, the polymer forms a network of polymer chains through the volume of monomer. The electrolyte material 120 can be deposited into a cell of the substrate (i.e., the anode), exposed to electromagnetic radiation to initiate curing of the monomer, and then exposed to a secondary solvent to dissolve the polymer out of the monomer once the monomer is cured, thereby yielding an electrolyte defining a network of open-cell pores through its full thickness. Once the monomer is cured, cathode material can be deposited over the electrolyte in Block S130, etc. to complete the battery.

In this variation, the cathode can also include both the secondary solvent and a second volume of the polymer; the secondary solvent present in the cathode can thus wet the electrolyte material 120, dissolve the polymer in the electrolyte, and draw the polymer toward the cathode, thereby: smoothing a density of the polymer through the thickness of the battery cell 104, which may improve performance of the battery cell 104; while also clearing the polymer from pores in the electrolyte to make room for transport of solvated lithium ions from the cathode toward the anode when the battery cell 104 is charged (and vice versa when the battery cell 104 is discharged).

Therefore, rather than rely on natural porosity of a native photopolymer structure, the electrolyte material 120 can include native photopolymer combined with an additive prior to deposition and curing within a cell in the substrate (i.e., the anode) in order to: produce a contiguous network of voids of controlled dimension throughout the volume of the native photopolymer once the electrolyte material 120 is cured and once the additive is dissolved out the native photopolymer structure. The resulting electrolyte can thus: exhibit greater flux of solvated lithium ions between the cathode and anode; while also preventing physical propagation of the cathode toward the anode, and vice versa; and preventing flow of electrons between the cathode and the anode within the battery cell 104.

For example: the primary solvent can include cyclopentanone; the monomer can include an epoxy-based negative photoresist, such as a Bisphenol A Novolac epoxy (e.g., "SU-8"); the photocatalyst can include a photoacid generator, such as triarylsulfonium/hexafluoroantimonate salt; and the polymer can include poly(methyl methacrylate) (or polysulfone, polycarbonate, etc.). In this example: the secondary solvent can include propylene carbonate (or "PC"); and the cathode material can include active lithium-storing material, carbon (e.g., graphitic carbon and carbon black), poly(methyl methacrylate), a binder (e.g., polyvinylidene difluoride (or "PVDF")) and lithium salt in solution with PC. The electrolyte can also include a lithium salt (e.g., $LiPf_6$) to further facilitate conduction of lithium ions through pores in the cured electrolyte.

The monomer, polymer, primary solvent, lithium salt, and photocatalyst can therefore function as a photocurable electrolyte material 120. Once a volume of the photocurable electrolyte material 120 is deposited into a cell in the substrate and cured, the primary solvent can be removed from the cured electrolyte material 120. The secondary solvent can then be introduced to dissolve the polymer out of pores in the cured electrolyte material 120, thereby yielding a conformal electrolyte that: exhibits improved chemical affinity for a polymer network and electrolyte solvents in a cathode; and exhibits greater porosity (e.g., greater free-volume) for solvent and solvated lithium ion motion between the anode and the cathode; without substantially sacrificing inhibition of electrical shorts between the anode and the cathode, such as due to dendrite growth across the electrolyte boundary between the anode and cathode.

4.2 Electrolyte Coating

Block S120 of the method S100 recites coating vertical surfaces of posts in each cell, in the set of cells, with an electrolyte material 120. In one implementation, in preparation for coating the substrate with a uniform thickness of electrolyte material 120, a second optical mask defining windows (or "opens") over designated locations of each post and over designated locations of each wall is fabricated. For example, like the first optical mask, the second optical mask can include a transparent fused silica blank covered with chrome metal-absorbing film extending over each designated cell area but excluded from designated post and wall areas. In this example, the chrome metal-absorbing film can define: a set of windows, each coaxial with its corresponding post location and defining a geometry offset outwardly from the target final geometry of the corresponding post by the target thickness of the electrolyte layer (e.g., 20 microns); and a set of rectilinear windows, each defining a perimeter extending along and offset from designated perimeters of walls—toward the interior of an adjacent cell—by the target electrolyte thickness, as shown in FIG. 4.

Once the second optical mask is fabricated, each cell is filled with electrolyte material 120 up to a uniform planar surface offset above the top surface of the walls. For example, the electrolyte material 120 can include a photocurable material (e.g., an epoxy-based material, such as Bisphenol A Novolac epoxy) and can be doctor bladed (or spin-coated, etc.) onto the top of the substrate up to a height offset above the tops of the walls by the target electrolyte thickness (plus additional thickness to compensate for volume change resulting from cooling and/or monomer cross-linking as the electrolyte cures). The second optical mask is then located over and aligned to the substrate; the electrolyte material 120 is exposed to radiation through the second photomask in order to selectively cure the electrolyte over the tops of the posts and walls and down the vertical surfaces of the posts and walls while leaving electrolyte material 120 between adjacent posts and between the walls and posts generally uncured. In particular, because the second optical mask defines windows (i.e., openings) offset beyond the vertical surfaces of the posts and walls by the target thickness of the electrolyte (or by a similar geometry compensated for by optical magnification of processing equipment), the second optical mask can pass radiation toward the electrolyte material 120 to cure a thin "film" of electrolyte material 120 of a target thickness over tops and over vertical surfaces of the posts and walls. By blocking light from reaching electrolyte material 120 further offset from vertical surfaces of the posts and walls, the second optical mask can prevent exposure of volumes of electrolyte material 120 in voids between posts and between posts and walls to radiation, thereby preventing these volumes from curing.

4.3 Selective Removal of Uncured Electrolyte

In one variation shown in FIG. 4, the second optical mask can then be separated from the substrate and electrolyte material 120 (hereinafter the "assembly"). Uncured electrolyte material 120 can then be removed from volumes between posts and between posts and walls while maintaining at least a minimum thickness of electrolyte material 120 over the bottom of each cell. In particular, removal of uncured electrolyte material 120 can occur from the top planar surface of the electrolyte downward toward bases of the cells. However, removal of uncured electrolyte material 120 can be controlled to ensure that a minimum or target thickness of electrolyte material 120 remains over the bottom of each cell in order to prevent direct contact (i.e., shorting) between the substrate (i.e., the anode) and the cathode material later dispensed into the cells in Block S130. In one example, the substrate is immersed in a wet etchant that selectively dissolves uncured epoxy-based materials (e.g., uncured electrolyte material 120), and this wet etchant can be agitated to control exposure of uncured electrolyte material 120 to active wet etchant in order to achieve predictable etch rate for change in depth of uncured electrolyte material 120 per unit time during removal of uncured electrolyte material 120 with the wet etchant. In this example, a target duration of exposure of the assembly to the wet etchant can therefore be calculated by: subtracting a target thickness of the electrolyte over bases of the cells (e.g., 10-20 micrometers, plus a safety factor of 25%) from an initial thickness of the electrolyte material 120 from its top planar surface to bases of the cells; and then dividing this sum (which may approximate a nominal height of the posts and walls) by the etch rate. In Block S120, the substrate can thus be exposed to the wet etchant for the target duration.

At the conclusion of the target duration, the substrate can be removed from the wet etchant to yield cured electrolyte material 120 across the tops and vertical sides of the walls and posts and to yield uncured electrolyte material 120 along the base of each cell. The entire assembly can then be re-exposed to radiation in order to cure remaining uncured electrolyte material 120 across the bottom of the cells. The resulting assembly can thus define multiple cells, each bound on all sides by a wall and containing multiple posts; and the tops of each wall and post, the sides of each wall and post, and the base of each cell can thus be coated with an approximately uniform thickness of electrolyte material 120 of at least the threshold minimum thickness, as shown in FIG. 4.

Therefore, coating vertical surfaces of posts in each cell—in the set of cells in the substrate—with the electrolyte material 120 in Block S120 can include: fabricating an electrolyte mask defining a window at a location of each post in the set of posts in each cell in the set of cells, each window offset outwardly from a corresponding post by approximately a target thickness of the electrolyte material 120; filling each cell, in the set of cells, with the electrolyte material 120; arranging the electrolyte mask over the substrate with windows in the electrolyte mask aligned to corresponding posts in each cell in the set of cells; exposing the substrate to electromagnetic radiation through the electrolyte mask to selectively cure the target thickness of the electrolyte material 120 around vertical surfaces of the set of posts in each cell in the set of cells; controlling removal of uncured electrolyte material 120 from each cell in the set of cells down to approximately the target thickness of electrolyte material 120 over the base of each cell in the set of cells; and exposing the substrate to electromagnetic radiation to cure the electrolyte material 120 over the base of each cell in the set of cells.

4.4 Complete Removal of Uncured Electrolyte

Figure 5:
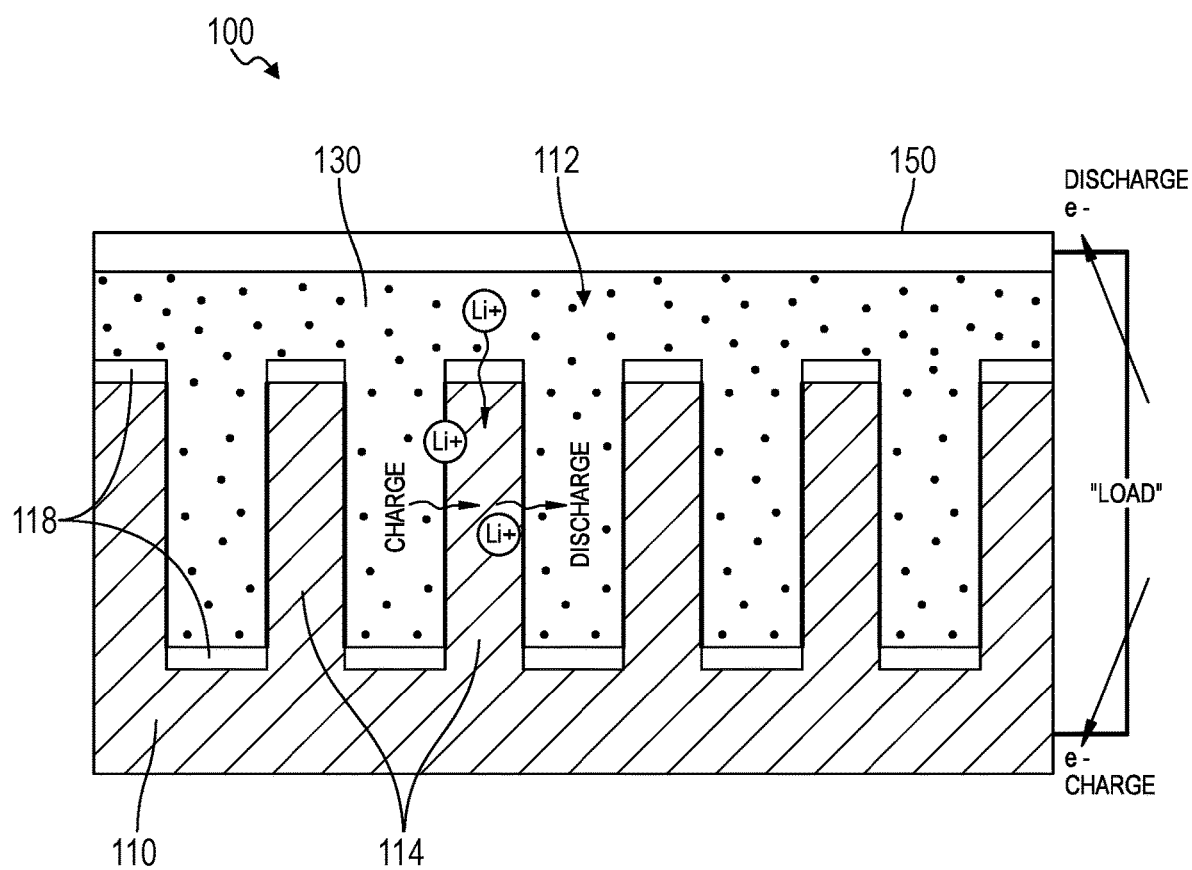
FIG. 5 is a schematic representation of one variation of the battery system.

In another variation shown in FIG. 6, prior to depositing the electrolyte material 120 into each cell in the substrate in Block S120, the base of each cell can be passivated around each post in the cell. For example, a dielectric material can be deposited across the base of each cell (and across the tops of each post and along the top of the continuous wall around the cell), as shown in FIGS. 5 and 6; or a superficial layer of silicon across the base of each cell can be converted to an oxide to prevent conduction of lithium ions between the substrate and the electrolyte layer through this passivated material.

In this variation, an electrolyte mask defining a window at a location of each post in the set of posts in each cell in the set of cells can be fabricated, wherein each window is offset outwardly from a corresponding post by approximately a target thickness of the electrolyte material 120; each cell—in the set of cells in the substrate—can be filled with the electrolyte material 120; the electrolyte mask can be arranged over the substrate with windows in the electrolyte mask aligned to corresponding posts in each cell in the set of cells; the substrate can be exposed to electromagnetic radiation through the electrolyte mask to selectively cure the target thickness of the electrolyte material 120 around vertical surfaces of the set of posts in each cell in the set of cells; and all uncured electrolyte material 120 can be removed from each cell in the set of cells in Block S120.

Generally, in this variation, the base, post, and continuous wall that defines each cell in the substrate is passivated—such as through addition of a dielectric material or through selective conversion of silicon into an oxide layer across these horizontal surfaces—in order to inhibit conduction of both lithium ions and electrons through these horizontal surfaces.

For example, after the substrate is etched to form the set of cells, chemical vapor deposition (or "CVD") techniques can be implemented to coat the vertical and horizontal surfaces within and around these cells—including the base, walls, and posts of each cell—with a (substantially) uniform layer of silicon nitride, such as a 200-nanometer-thick layer of silicon nitride, as shown in FIG. 6. Plasma-enhanced CVD (or "PECVD") techniques can then be implemented to preferentially coat the horizontal surfaces within and around these cells—including the base, tops of the posts, and the top of the wall around each cell—with a layer of silicon dioxide, such as a 200-nanometer-thick layer of silicon dioxide, that functions as a mask over select areas of the silicon nitride layer. The substrate can then be exposed: to a first etchant to selectively remove regions of the silicon nitride layer where not masked by a silicon dioxide layer; and then to a second etchant to remove all silicon dioxide from the substrate, thus leaving silicon nitride over the base of each cell, over tops of continuous walls encircling these cells, and tops of posts in these cells. Because these remaining areas of silicon nitride were applied by CVD, these silicon nitride layers may exhibit minimal or no porosity and may therefore exhibit consistent and reliable resistance to transfer of electrons and lithium ions across these surfaces inside the battery.

In a similar example, once cells in the substrate are coated with the layer of silicon nitride (e.g., via CVD): the silicon nitride is dry-etched from horizontal surfaces within each cell (i.e., from the base of each cell and the tops of anode posts 114 in each cell); a silicon oxide layer is thermally grow across exposed horizontal silicon surfaces within each cell; and remaining silicon nitride in each cell is removed via wet-etching, thereby yielding exposed vertical surfaces of silicon and exposed horizontal surfaces of silicon oxide within each cell. These this silicon oxide layers across horizontal surfaces within the cell may exhibit minimal or no porosity to lithium ions and may therefore prevent shorting between horizontal anode surfaces and the cathode within the resulting battery cell 104.

The electrolyte material 120 can then be deposited into each cell, and electrolyte can be selectively cured around vertical surfaces inside these cells (i.e., sides of posts and interior surfaces of continuous walls around these cells). All uncured electrolyte material 120 can then be removed to yield an assembly in which: passivated material coats horizontal surfaces of the substrate within and around each cell; and the electrolyte material 120 coats vertical surfaces in these cells. Cathode material can then be deposited into each cell over the cured electrolyte material 120 in Block S130, as described below.

In the variation described above in which posts in the cells define rectangular cross-sections with their broad faces parallel to the {110} plane of the crystalline structure of the substrate, the base of each cell may exhibit (significantly) less conductivity to lithium ions than the vertical faces of these posts; the effect of passivating the base of a cell on performance of the resulting battery may therefore be minimal. However, such passivation of horizontal faces in each cell in the substrate may enable all uncured electrolyte material 120 to be removed from over these horizontal surfaces after electrolyte material 120 is cured over vertical surfaces in these cells in Block S120, which may loosen constraints on processing the electrolyte and thereby increase yield of discrete, functional battery cells 104 fabricated on the singular substrate.

Furthermore, at sufficient concentrations, introduction of lithium ions into a mono-crystal silicon structure may cause the silicon structure to fracture. Therefore, the passivation layer across the base of a cell can prevent permeation of lithium ions into the anode current collector in the resulting battery cell 104 and thus serve to preserve the mono-crystal silicon structure of the anode current collector and ensure integrity of the battery cell 104 during future charge/discharge cycles.

5. Cathode

As shown in FIGS. 1, 4, 5, and 6, the cathode material 130 fills each cell around posts in the cell to form a three-dimensional cathode that surrounds anode posts within the cell on all but one side (i.e., at the base of the cell). In one implementation, dry cathode material 130 includes: active lithium (e.g., 85% by mass lithium-storing particles, such as LiCoO2, NCM, or NCA); carbon (e.g., 10% by mass graphitic carbon and carbon black); and a binder (e.g., 5% by mass polyvinylidene difluoride (or "PVDF")). (Alternatively, dry cathode material 130 can include a gel (e.g., 5% polyethylene oxide and/or poly(methyl methacrylate) by mass) rather than the binder.) For example, the cathode material 130 can include: $LiNi_{1/3}Mn_{1/3}Co_{1/3}O_2$. Once cured (e.g., dried), a volume of the cathode material 130 contained within a cell can define a discrete, flexible, three-dimensional cathode that: encompasses the sides and tops of posts within the cell over the electrolyte layer (and the passivated layer 118 described above); and extends up to the edge of the continuous wall that encircles the cell.

Block S130 of the method S100 recites depositing a cathode material 130 into each cell, in the set of cells, around the set of posts in the cell.

5.1 Floating Cathode Material Over Solvent

In one implementation shown in FIG. 4, in Block S130, each cell is preloaded with solvent (e.g., PC or other mixture of solvents) that dissolves the cathode material 130 and that exhibits low volatility under standard processing temperatures and pressures. In this implementation, a solvent volume for each cell—equivalent to the sum of a void volume of the cell (e.g., the volume of the cell less the volumes of the posts and electrolyte layer in the cells) and an additional volume of solvent to "float" over the cell—is calculated. This volume of solvent can then be dispensed into the cell with an automated liquid dispensing system, such as a computer-controlled liquid pipetting system; this process can be repeated in series for each other cell in the assembly. (In another implementation, the solvent is flowed over the substrate to fill void in the cells, and the substrate is spun or doctor bladed to remove excess solvent down to a substantially uniform height above the assembly.) The assembly can then be placed in a vacuum chamber for a period of time to draw gas (e.g., air) bubbles from the solvent, as shown in FIG. 4.

A volume of wet cathode material 130 (e.g., cathode material 130 dissolved in solvent) can then be dispensed over solvent in each cell; the wet cathode material 130 can include a proportion of solvent (e.g., 20%) sufficient for the wet cathode material 130 to float over the volume of solvent currently occupying the cell and for solids in the wet cathode material 130 to then flow downwardly (e.g., by gravity) into the cell, thereby displacing solvent out of the cell. In this implementation, a volume of wet cathode material 130 containing enough dry cathode material 130 sufficient to fill a cell up to and over its posts once cured can be calculated; this volume can then be dispensed into the cell with the same or other automated liquid dispensing system. For example, the automated liquid dispensing system can dispense a metered "drop" of wet cathode material 130 into the cell through a computer-numerically-controlled pipette; the volume of wet cathode material 130 then penetrates and fills the cell around and over the posts. This process can be repeated for each cell in the assembly.

While wet cathode material 130 is dispensed into the cells and while solids (e.g., lithium, carbon, binder, and/or gel) in the wet cathode material descend down to fill the cell and to displace solvent out of the cell, ambient conditions (e.g., ambient pressure and temperature) around the assembly can be held substantially constant over a period of time. The assembly can also be agitated (e.g., vibrated) to assist rate of descent and uniformity of distribution of cathode material 130 solids within the cells.

Additionally or alternatively, a vacuum can be drawn over the substrate to increase rate of sedimentation of solids toward the bottom of the cell and solvent toward the top of the cell. Furthermore, once wet cathode material 130 is deposited into the cells or a target period of time later (e.g., correlated with target solids distribution within the cells), the environment around the assembly and/or the assembly itself can be heated to evaporate solvent from the cell, thereby curing the cathode material 130. For example, the duration of time, the assembly temperature, ambient temperature, and/or ambient pressure over which the cathode material 130 is cured can be controlled to yield a target proportion of solvent (e.g., 5%) remaining in the cathode upon conclusion of the cathode curing cycle. In particular, by maintaining a minimum proportion of solvent in the cathode material 130 at the conclusion of the cathode curing cycle, the cathode material 130 may: remain fluid and/or flexible and may therefore deform more readily against the cathode current collector that is installed over the cathode without requiring rewetting, thereby improving mechanical and electrical coupling between the cathode material 130 and the cathode current collector. Presence of solvent in the cathode material 130 can also improve ion motion through the cathode material 130 during operation of the battery. Following Block S130, the assembly can thus include a substrate defining a set of cells coated with cured electrolyte material and filled with cured cathode material 130.

In one variation, multiple discrete volumes of wet cathode material 130 are deposited into a cell in Block S130. In one implementation, the substrate defines an elongated (e.g., "high aspect ratio") cell. In this implementation, multiple "drops" of wet cathode material 130 can be dispensed onto local regions of the cell in order to achieve more uniform distribution of the cathode material 130 across the cell over a curing period of limited duration. In one example, for a cell exhibiting a length approximately twice its width, a first drop of wet cathode material 130 can be dispensed at a first position offset from a first end of the cell by one-third the length of the cell, and a second drop of wet cathode material 130 can be dispensed at a second position offset from the first end of the cell by two-thirds the length of the cell. In another example, for a cell exhibiting a length approximately four times its width, a first drop of wet cathode material 130 can be dispensed at a first position offset from a first end of the cell by one-fifth the length of the cell, a second drop of wet cathode material 130 can be dispensed at a second position offset from the first end of the cell by two-fifths the length of the cell, a third drop of wet cathode material 130 can be dispensed at a third position offset from the first end of the cell by three-fifths the length of the cell, etc. Similarly, the substrate can define a cell of length and width that both exceed a maximum dispersal dimension of wet cathode material 130 deposited in drop form into a cell. In this implementation, discrete volumes (e.g., "drops") of wet cathode material 130 can be deposited in a grid array into the cell. The volumetric sum of these discrete volumes can equal the target total volume of wet cathode material 130 for the cell, and these volumes of wet cathode material 130 can disperse downward into the cell and merge laterally across the cell to fill voids in the cell with a continuous volume of cathode material 130.

5.2 Direct Deposit of Cathode Material

Alternatively, the cathode material 130 can be deposited directly into cells in the substrate. In this variation, dry cathode material 130 can include: lithium ion storing material (e.g., lithium cobalt oxide); conductive additives (e.g., graphitic carbon); and a binder (e.g., PVDF). In preparation for depositing the cathode material 130 into cells in the substrate, the cathode material 130 can be dissolved into a first solvent (e.g., dimethyl sulfoxide) (i.e., a "processing solvent") to form a cathode slurry—of known composition (e.g., 50-70% first solvent by volume)—capable of flowing into cells in the substrate. This cathode slurry can then be deposited into each cell in the substrate, such as via the computer-numerically-controlled liquid pipetting system described above.

For example, the computer-numerically-controlled liquid pipetting system can: align a pipette tip over the lateral and longitudinal center of a cell; directly deposit a target volume of the cathode slurry (e.g., 110% of the empty volume of the cell) into the cell; draw the pipette tip around the perimeter of the cell just inside the continuous wall that encompasses the cell to pull the cathode slurry up to the edge of the continuous wall; and repeat this process for each other cell in the substrate. Once each cell is filled with the cathode slurry, the assembly can be agitated and/or placed in a vacuum chamber to remove gas bubbles from these discrete volumes of cathode slurry. The assembly can then be heated in a vacuum chamber over a period of time to fully evaporate the first solvent from the cathode slurry in the array cells in the substrate, thereby rendering a discrete volume of dry, porous cathode material 130 in each cell. For example, each discrete volume of dry cathode material 130 in each cell can exhibit approximately 30-40% porosity, as such voids in the dry cathode material 130 were previously occupied by the first solvent.

A target volume of a second solvent 132 (i.e., a battery electrolyte solvent, such as PC, that dissolves lithium ions, such as $LiPf_6$) can then be deposited onto the discrete volume of dry cathode material 130 in each cell in the substrate to rewet the cathode material 130. For example, for each cell in the substrate, a volume of the second solvent 132 equivalent to 110% of the porous volume in the dry cathode material 130 in the cell can be deposited—via a computer-numerically-controlled liquid pipetting system—onto the cell. This second solvent 132 can then disperse into voids in a discrete volume of dry cathode material 130 in a cell—such as when the substrate is placed within a vacuum chamber—and can flow into the adjacent volume of electrolyte material within the cell, thereby wetting both the cathode and the electrolyte in this cell with a solvent capable of transporting lithium ions within the resulting battery cell 104.

Therefore, by processing the cathode material 130 with the first solvent, the cathode material 130 can be dissolved and flowed directly into a cell in the substrate. With the processing solvent then fully evaporated from the cathode material 130 within the cell, the binder in the cathode material 130 can retain the dry cathode material 130 in a (semi-) rigid form within the cell. By then depositing a dosed amount of the second solvent 132 (containing lithium salt) onto the dry, porous cathode in the cell, voids in the cathode material 130 may be fully and repeatably wetted such that the composition of the cell is controlled. Furthermore, unlike the first solvent, the second solvent 132 may not dissolve the cathode material 130; once formed and rewetted with the second solvent 132, a discrete volume of cathode material 130 can thus remain in its (semi-) rigid form within its cell throughout subsequent processing and operation of the resulting battery cell 104, thereby further enhancing stability and robustness of the resulting battery cell 104.

5.3 Simultaneous Processing of Multiple Cells

To process multiple cells defined by a single substrate, the foregoing processes can be executed in parallel to fill each cell—of the same or different geometries—in the substrate with cathode material 130, as shown in FIG. 1. For example, the computer-numerically-controlled liquid pipetting system described above can sequentially dispense a metered volume of wet cathode material 130 into each cell. Once a target volume of cathode material 130 has been dispensed into each cell, the assembly can be processed (e.g., agitated, heated under vacuum) to evacuate the first solvent (i.e., the processing solvent) from cathode material 130 in each cell and to cure these discrete volumes of cathode material 130 prior to introducing the second solvent 132 (i.e., the battery electrolyte solvent and dissolved lithium salt) into these cells.

However, cathode material 130 can be dispensed into and processed to form a discrete cathode structure—isolated from anode surfaces—within each cell in the substrate in any other way in Block S130.

6. Seal

As shown in FIGS. 1 and 3B, the seal 140 extends along tops of the walls of each cell and functions to bond the cathode current collector above to the continuous wall around the cell below. For example, in the implementation described above in which the top of the continuous wall around a cell in the substrate is passivated and in which the electrolyte and cathode material in the cell extend up to but not over this continuous wall, the seal 140 can be deposited or otherwise arranged directly over this passivated material, and can bond the cathode current collector above directly to this passivated layer 118 on the top of the continuous wall, and can cooperate with this passivated layer 118 to electrically isolate the cathode current collector above from the anode current collector below. Furthermore, because the substrate—formed from a mono-crystal silicon wafer—and the cathode current collector (e.g., an aluminum foil) may be substantially impermeable to moisture, debris, gasses, etc., the seal 140 can also cooperate with the substrate and the cathode current collector to enclose and seal each cell in the assembly and each resulting battery cell 104 dissected from the assembly.

Block S140 of the method S100 recites applying a seal 140 along a top of the continuous wall encompassing each cell in the set of cells. Generally, in Block S140, the seal 140 can be applied over the assembly in preparation for installation of a continuous cathode current collector sheet over the assembly to enclose the cells and to electrically couple the cathode material to the cathode current collector. In one implementation, the seal 140 includes a sheet of non-conductive adhesive. In preparation for application over the assembly, the sheet is cut to remove material from regions of the sheet corresponding to the interior cross-sections of cells in the substrate. For example, the sheet can be backed with a backing layer; a computer-controlled plotting tool (e.g., including a blade manipulated by a two-axis computer-controlled gantry) a computer-controlled laser cutter can cut the sheet to selectively separate regions of the sheet corresponding to walls of the substrate from regions of the sheet corresponding to cells in the substrate, the latter of which are removed from the backing later prior to installation over the assembly. In another example, the sheet is cut with a die-stamping tool, such as by a computer-controlled die-stamping machine. In particular, a single sheet of seal material can span the full width and height of the substrate (e.g., an 8" diameter circular area matched to an 8" diameter silicon wafer) and can be cut (or "trimmed") according to a standard or custom cell layout of the substrate such that, when installed over the substrate and electrolyte layer, the seal 140 forms a continuous seal over all walls of the substrate but does not (significantly) extend into cells of the substrate.

In one implementation in which the electrolyte and cathode materials within a cell extend up to but not (significantly) over the wall encompassing this cell in the substrate, the seal 140 is applied over the passivated layer 118 arranged along tops of the continuous wall encircling each cell in the set of cells in the substrate, and the cathode current collector is adhered to the seal 140. In another implementation in which the cathode material extends over the continuous walls around each cell, the seal 140 can bond to the cathode material over these walls on one side and to the cathode current collector on its other side. In yet another implementation in which the cathode material extends up to but not (significantly) over the walls of the substrate, the seal 140 can bond to the electrolyte material over walls of the substrate on one side and to the cathode current collector on its other side.

In one example: the assembly is placed over a first planar surface; the sheet of seal and backing layer are aligned to the assembly and fixed to a planar face of a stamping die (e.g., with vacuum) with the backing layer against the die; and the die is lowered toward the assembly up to a target compression force corresponding to the cross-sectional area of walls of the substrate to bond the seal 140 to the assembly. Once the die is retracted, the backing layer is removed in preparation to receive the cathode current collector, as described below.

In another example: the assembly is placed over a first planar surface; the sheet of seal and backing layer is aligned to the assembly; one edge of the sheet is placed in contact with the assembly (e.g., the electrolyte layer) over an outermost wall of the substrate; and a roller is run across the sheet to force the seal 140 into contact with the assembly. In this example, the roller can be driven downward onto the assembly with a compression force proportional to the cross-sectional area of walls of the substrate and proportional to the radius of the roller in order to bond the seal 140 to the assembly. Once the roller is passed fully over the sheet, the roller is retracted and the backing layer is removed in preparation to receive the cathode current collector.

Following Block S140, the assembly can thus include a substrate defining a set of cells coated with cured electrolyte material and filled with cured cathode material and a seal 140 extending over the top of each wall but excluded from the interior region of each cell.

Alternatively, similar methods and techniques can be implemented to align and bond the seal 140 to the interior surface of the cathode current collector before the cathode current collector is installed over the assembly. In one example: a sheet of sealant with a nonstick backing is trimmed according to the geometry of walls defined across the substrate; the trimmed sealant sheet is applied to the cathode current collected described below (e.g., an aluminum film or sheet); the nonstick backing is removed from the sealant; the cathode current collector is located over the substrate with the sealant sheet aligned to corresponding walls defined across the substrate; and the cathode current collector is pressed into the substrate and heated to adhere the sealant sheet to the substrate and thus seal the cathode current collector to the substrate.

Yet alternatively, the seal 140 can be deposited or patterned across the substrate and/or across the cathode current collector, such as via photolithography or sputtering.

However, the seal 140 can define: any other free-standing structure installed in any other way onto the substrate and/or the cathode current collector; or can be fabricated in any other way on the substrate and/or the cathode current collector.

7. Cathode Current Collector

As shown in FIGS. 1, 4, 5, and 6, the cathode current collector 150 is arranged over the substrate, is bonded to the seal, and contacts the cathode material in each cell to enclose each cell and to form a multi-cell assembly 102. Generally, the cathode current collector 150 is bonded to the assembly—over the cathode—by the seal and functions to electrically couple to each discrete volume of cathode material (i.e., cathodes) in discrete cells defined by the substrate. In one implementation, the cathode current collector 150 can include a thin (e.g., 70-micron-thick) metallic (e.g., aluminum, aluminum alloy, stainless steel, or nickel) sheet (or film, foil) spanning an area approximating (or slightly greater than) the full width and length of the assembly. For example, the cathode current collector 150 can include a metallic foil bonded to the seal around each cell in the set of cells and can extend continuously across each cell in the set of cells in the substrate such that the cathode current collector 150 spans and contacts discrete volumes of the cathode material in each cell in the set of cells in the substrate.

Alternatively, the cathode current collector 150 can include a conductive rigid structure, such as: a doped silicon structure; or a ceramic layer including a metallic film applied across its cathode-facing side and a conductive via for attachment of an electrical lead to the cathode current collector 150, as described below. However, the cathode current collector 150 can define any other rigid or flexible structure including any other conductive material.

Block S150 of the method S100 recites installing a continuous cathode current collector panel over the substrate, bonded to the seal, and contacting the cathode material in each cell, in the set of cells, to form a multi-cell assembly 102. In one implementation: the assembly is placed over a first planar surface; and the cathode current collector 150 is aligned to and placed over the assembly. A second planar surface is then lowered toward the cathode current collector 150, and the assembly and the cathode current collector 150 are compressed—up to a target compression force—between the two planar surfaces in order to bond the cathode current collector 150 to the assembly. In this example, the seal can be of a heat-curable material (e.g., a thermosetting plastic), and the second planar surface (and the first planar surface) can be heated during this assembly process; the cathode current collector 150 can communicate thermal energy from the die into the seal to cure the seal, thereby fixing the seal to the electrolyte (or cathode) below and to the cathode current collector 150 above. Alternatively, the seal can be of a pressure- or solvent-curable material.

Alternatively, a roller can be run across the cathode current collector 150; the cathode current collector 150 and the assembly can be compressed between the first planar surface and the roller to bond the cathode current collector 150 to the assembly. In this implementation, the roller can locally deform the cathode current collector 150 to improve contact with both the seal over walls encompassing cells defined by the substrate and with cathode material in each cell defined by the substrate, thereby achieving sufficient bonding between the cathode current collector 150 and the seal to prevent exposure and egress of solvent and achieving sufficient electrical conductivity between the cathode current collector 150 and discrete cathodes in each cell. In this implementation, the roller can also be heated in order to cure the seal during this assembly process, as described above.

In the foregoing implementation, as the cathode current collector 150 is depressed (e.g., rolled) onto the assembly, a free, unbounded end of the cathode current collector 150 can be elevated off of an adjacent region of the assembly as the roller advances across the cathode current collector 150, thereby permitting release of gases (e.g., air) between the cathode current collector 150 and assembly and thereby maintaining pressures within cells—sealed by the cathode current collector 150—at or near ambient pressure. In this implementation, the composition and pressure of the environment around the assembly can also be controlled. For example, the assembly can be maintained in a dry (e.g., a moisture- and oxygen-free) environment at ambient pressure in order to: limit absorption of moisture into the cathode or other elements of the assembly; to limit oxidation of the cathode current collector 150 or other element of the assembly; and to achieve pressures inside the set of cells—sealed from above by the cathode current collector 150—that approximate ambient air pressure.

Furthermore, at this step, the cathode material can include a proportion of solvent (e.g., 5%) such that the cathode material remains pliable. Thus, when the cathode current collector 150 is installed over and compressed against the assembly, the cathode material can: deform against the cathode current collector 150; spread across and fill each cell in the substrate; and thus achieve substantially complete mechanical contact with the interior face of the cathode current collector 150 across the cross-section of each cell.

In another implementation, conductive material is deposited (e.g., plated) across the seal and open cathode material to form the cathode current collector 150. The seal can then be cured (e.g., by heating) to ensure its bond to the cathode current collector 150 above and to the electrolyte below.

In yet another implementation, the cathode current collector 150: can define a doped silicon layer; and can be soldered to a passivated (e.g., silicon oxide, silicon nitride) layer on the wall around a cell, such as via glass frit bonding (or "glass soldering").

Following Block S150, the assembly includes: a substrate defining a set of cells coated with cured electrolyte material and filled with cured cathode material; and a continuous cathode current collector 150 cooperating with a seal to enclose and electrically couple to cathodes in each cell. This assembly can then be tested and dissected (i.e., cut) along each wall to form multiple discrete, sealed, single-cell batteries.

8. Charging and Testing

In one variation, cells in the assembly can also be cycled (e.g., charged and discharged) en masse before the assembly is diced into multiple batteries. For example, a battery charger can be connected to the cathode current collector on one side and to the substrate on the opposite side and then cycled through one or more charge and discharge cycles in order to "pre-cycle" the set of cells. In this example, the battery charger can additionally or alternatively be activated to charge the cells to capacity, such as before testing, as described below. (Alternatively, the cells can be pre-cycled and/or charged after testing.)

In this variation, the assembly is tested for shorts before dicing. In one implementation, once the cathode current collector is installed and bonded to the seal, battery tester (e.g., an electrochemical impedance spectroscopy reader) is connected to the cathode current collector on one side and to the substrate on the opposite side; an actual capacity and an actual impedance of the total assembly is thus measured by the battery tester and recorded. In this example, a capacity and an impedance of the total assembly can be predicted based on: post sizes and density; electrolyte properties and thickness; electrical properties of the cathode material; etc. If the actual capacity of the total assembly differs significantly from (e.g., is significantly less than) the predicted capacity, the assembly can be labeled for discard or as a lower tier (e.g., lower quality) battery. If the actual impedance of the total assembly differs significantly (e.g., is significantly less than) from the predicted impedance, the assembly can be determined to have an internal short. Multiple additional impedance readings can then be recorded from various discrete regions (e.g., quarters) of the assembly in order to isolate a particular region exhibiting the lowest impedance and therefore likely to contain this short; this particular region can be separated (e.g., cut) from the assembly, such as described below, and discarded. The impedance of the assembly can then be retested to confirm that no shorts are present in the remainder of the assembly before the assembly is diced into multiple discrete batteries.

9. Dicing and Battery Separation

As shown in FIGS. 1, 2 and 3A, Block S160 of the method S100 recites dissecting the multi-cell assembly 102 along the continuous wall of each cell, in the set of cells, to form set of discrete single-cell batteries in Block S160. Generally, once the cathode current collector is bonded to the seal, the assembly can be cut (or "diced") to segment the assembly into multiple (e.g., dozens, hundreds, or thousands of) discrete batteries. For example, the assembly can be cut along the center of each linear wall with a dicing saw to form multiple discrete rectilinear batteries. In another example, the assembly can be cut along the center of each linear wall with a laser to form multiple discrete rectilinear, polygonal, circular, elliptical, or amoebic batteries. In yet another example in which the valleys are etched in the substrate between walls of adjacent cells in Block S110, the substrate can be stressed and broken along these valleys to separate these cells separated from the assembly.

The assembly—thus fabricated on a singular mono-crystal silicon wafer—can therefore be segmented into multiple discrete single-cell batteries. Once separated from the assembly, such a single-cell battery includes: a segment of the substrate (e.g., doped silicon wafer) defining a single cell containing multiple anode posts, surrounded on all sides by a continuous wall, filled with electrolyte material and cathode material, and sealed from above with a segment of the cathode current collector. The segment of the cathode current collector can therefore be bonded to the segment of the substrate by a segment of the seal; and the segment of the cathode current collector, the segment of the seal, and the segment of substrate can cooperate to seal the porous cathode and porous electrolyte inside the battery cell 104 from exposure (e.g., to prevent exposure to moisture and oxygen in ambient air) and to prevent egress of solvent from the cell. The cathode current collector can thus be connected to an external electrical circuit to communicate negative charge (i.e., electrons) from the cathode; the substrate can similarly be connected to the external circuit to communicate this negative charge into the anode posts, thereby completing the electrical circuit.

In one variation, once a battery is separated from the assembly, additional sealant can be applied to the sides of the battery to further prevent exposure to ambient and solvent and egress out of the cathode material via component junctions at the cathode current collector segments, the seal segment, the electrolyte, and/or the wall. For example, the battery can be dipped or sprayed with a sealant on all sides or across its (four) cut broken faces, as shown in FIG. 3B.

10. Packaging

Once battery cells 104 are separated from the assembly in Block S160, singular battery cells 104 or groups of battery cells 104 can be packaged for subsequent use to power an electric circuit or electrical component. For example, singular battery cells 104 or groups of battery cells 104 can be assembled into surface-mount or through-hole packages for subsequent installation directly on a PCB, as shown in FIG. 7.

Generally, a single-cell battery separated from the multi-cell assembly 102 in Block S160 can include: a substrate of silicon and defining a cell that includes both a base encompassed by a continuous wall and a set of posts extending normal to the base; an electrolyte material coating vertical surfaces of each post—in the set of posts—and vertical surfaces of the continuous wall in the cell; a cathode material filling the cell over the electrolyte material, between posts in the set of posts, and between the set of posts and the continuous wall; a seal extending along a top of the continuous wall; and a cathode current collector bonded to the seal, contacting the cathode material, and cooperating with the substrate to enclose the cell to form a battery unit. As described above, the substrate can include a segment of a mono-crystal silicon wafer; and each post—in the set of posts in the cell—can define a rectangular cross-section that extends upwardly from a base of the cell and that includes opposing broad faces perpendicular to the base of the cell and parallel to a {110} plane of a crystalline structure of the substrate.

The method S100 can therefore be executed to fabricate multiple such single-cell batteries—of the same or different geometries, as shown in FIG. 7—on a single silicon wafer with a limited investment in new tooling. Specifically, multiple batteries of the same or different custom, three-dimensional geometries can be fabricated on a single silicon wafer following production of as little as two new optical masks (e.g., a first mask for patterning cells in the substrate and a second mask for patterning the electrolyte material) and no other custom or unique hard or soft tooling. The method S100 can therefore be executed to enable rapid production of custom batteries, such as only singular battery units or in hundreds, thousands, or millions of battery units.

Furthermore, because a battery fabricated according to the method S100 includes an inter-digitated cathode and anode (i.e., because the battery is "three-dimensional"), the battery can exhibit a relatively high capacity per unit volume even within a custom footprint (e.g., a long, short, narrow, wide, or other millimeter-scale geometry). Multiple discrete battery cells 104 can also be assembled into a singular package to achieve even further custom geometries and performance characteristics, such as a corner- or L-shaped battery package for installation along a corner of a PCB. Finally, a battery fabricated according to the method S100 can be integrated into an SMT or through-hole integrated-circuit package, placed on a PCB, and passed through a reflow oven to complete the PCB, thereby enabling completion of the PCB at a reflow stage rather than necessitating subsequent connection to a battery and thus streamlining production of powered PCBs.

10.1 Leads

In one implementation shown in FIG. 7, in preparation for packaging a battery cell 104, discrete surface mount or through-hole leads can be connected to the substrate (i.e., the anode current collector) and the cathode current collector in the battery cell 104. For example, a single battery cell 104 can include: a segment of the substrate and a segment of the cathode current collector; and a first electrical lead coupled (e.g., soldered or bonded) to the segment of the substrate opposite the segment of the cathode current collector and a second electrical lead coupled to the segment of the cathode current collector opposite the segment of the substrate following separation of the particular single-cell battery from the multi-cell assembly 102. A packaging material 190 can then be formed around the battery cell 104 to encase the segment of the substrate and the segment of the cathode current collector—such as in a surface-mount technology format described below—and the first electrical lead 160 and the second electrical lead 162 can pass through the packaging material 190 for subsequent connection (e.g., soldering) to a PCB.

10.2 Package Format

As shown in FIGS. 3A and 7, the method S100 can further include Block S170, which recites, for one battery separated from the multi-cell assembly 102: connecting SMT or through-hole leads to a segment of the substrate and to a segment of the cathode current collector contained in the battery; and encasing the battery in a potting material 190 to form a surface-mount or through-hole battery. (Block S170 can similarly include, for a first discrete single-cell battery separated from the assembly: connecting a first electrical lead 160 to a segment of the substrate in the first discrete single-cell battery; connecting a second electrical lead 162 to a segment of the continuous cathode current collector in the first discrete single-cell battery; and encasing the first discrete single-cell battery in a packaging material 190 with the first electrical lead 160 and the second electrical lead 162 extending through the packaging material 190 in a surface-mount technology format.)

Generally, in this variation, a single battery cell 104 (or an assembly of multiple discrete battery cells 104, as described below) can be encased in potting material 190 defining a surface-mount or through-hole format with electrical leads passing through the potting material 190 according to a surface-mount or through-hole geometry and offset. For example, the battery can be supported in a standard SMT or through-hole component mold and then overmolded with low-glass-transition potting material (e.g., polyurethane, silicone), thereby enabling the completed battery to be passed through a reflow oven when assembled on a PCB. Alternatively, the battery can be dipped into potting material 190, or potting material 190 can be cast or printed around the battery cell 104.

However, a single-cell battery—once separated from the assembly in Block S160—can be packaged in any other way or in any other format in Block S170.

10.3 Multi-Cell Battery

In one variation shown in FIG. 7, multiple battery cells 104 cut from the multi-cell assembly 102 in Block S160 can be assembled into a taller, wider, longer, and/or more complex three-dimensional form prior to packaging. For example, multiple discrete single-cell batteries can be stacked [cathode current collector segment] to [substrate segment] and then encased in potting material 190 to form a tall, multi-cell battery unit. In this example, these discrete single-cell batteries can be bonded together with conductive adhesive or soldered together in parallel (i.e., an additive current configuration) or in series (i.e., an additive voltage configuration) prior to being encased with potting or other packaging material 190.

In another example, a first single-cell battery and a second single-cell battery—both fabricated concurrently on the same silicon wafer—can be arranged end-to-end (e.g., cathode current collector segment to substrate segment) and perpendicular to form a multi-cell "L"-shaped battery. The adjacent cathode current collector and substrate segments can be connected with a soldered or bonded wire, and the SMT or through-hole leads can be connected to an opposing cathode current collector and substrate segments before the multi-cell "L"-shaped battery is encased in packaging. The completed battery can then be installed along a corner of a PCB or around a rectangular electrical component on a PCB, as shown in FIG. 7.

Therefore, in the foregoing example, the substrate can define a set of cells, including: a first cell defining a first base of a first cell geometry and bounded by a first continuous wall; and a second cell adjacent the first cell, defining a second base of a second cell geometry different from the first cell geometry, and bounded by a second continuous wall. The electrolyte material can include: a first volume of electrolyte material coating vertical surfaces within the first cell; and a second volume of electrolyte material coating vertical surfaces within the second cell. The cathode material can include: a first volume of the cathode material arranged in the first cell over the first volume of electrolyte material; and a second volume of the cathode material arranged in the second cell over the second volume of electrolyte material and physically isolated from the volume of the cathode material. The seal can extend between the first cell and the second cell, along a top of the first continuous wall, and along a top of the second continuous wall. The cathode current collector can be bonded to the seal about the first cell and the second cell and extends continuously over the first volume of the cathode material and the second volume of the cathode material; and the substrate and the cathode current collector of the multi-cell assembly 102 can be divisible between adjacent segments of the first continuous wall and the second continuous wall to form a first discrete single-cell battery of a first battery geometry and a second discrete single-cell battery of a second battery geometry different from the first battery geometry. Furthermore, in this example, following separation from the multi-cell assembly 102, the first discrete single-cell battery can be arranged physically adjacent and can be electrically coupled to the second discrete single-cell battery with a principle axis of the first discrete single-cell battery perpendicular to a principle axis of the second discrete single-cell battery; and the first discrete single-cell battery and the second discrete single-cell battery can be encased in a packaging material 190 to form a discrete, L-shaped, multi-cell battery unit.

10.4 Charging Circuit

In one variation shown in FIG. 7, a charging circuit 180 is combined with a discrete single-cell battery prior to packaging. For example, a discrete charging circuit 180—such as including an integrated charging circuit 180 and passive electrical component assembled on a thin, stand-alone PCB—is paired with a battery cell 104 and is connected to segments of the substrate and the cathode current collector in the battery cell 104; this assembly is then encased in packaging material 190 to form a discrete single-cell battery with integrated charging circuit 180.

A charging circuit 180 can be similarly combined with an assembly of multiple discrete single-cell batteries, as described above, to form a multi-cell battery with integrated charging circuit 180.

10.5 First Charge Cycle

Once a single-cell (or multi-cell) battery unit 106 is thus fabricated and packaged, as described above, the battery unit 106 can be charged, as shown in FIG. 5. In particular, an electrical voltage potential can be applied across the cathode and anode current collectors of the battery unit 106: to migrate electrons from the cathode into the anode via a circuit external the battery unit 106; and to drive lithium ions—carried by the battery electrolyte solvent in the cathode and the electrolyte layer—from the cathode, through the electrolyte, and into posts extending from the base of the cell (i.e., the anode). As lithium ions enter these posts, envelopes of these posts may increase (i.e., these posts may "swell"). To accommodate this change in size of the posts, the electrolyte may deform, such as by migrating into pores in the cathode. When the battery unit 106 is later discharged by placing a load across the cathode and anode current collectors, lithium ions may migrate out of the posts, through the electrolyte, and back into the cathode as a chemical reaction inside the battery unit 106 releases electrons that flow from the anode, to the load external to the battery unit 106, and into the cathode, as shown in FIG. 5.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A battery system comprising:
a substrate defining a set of cells, each cell in the set of cells comprising:
a base encompassed by a wall; and
a set of fins extending from the base;
an electrolyte material coating surfaces of the set of fins in each cell in the set of cells;
a passivated material located across horizontal surfaces on the base and the set of fins in each cell in the set of cells;

a cathode material arranged in each cell, in the set of cells, over the electrolyte material and the passivated material; and a cathode current collector electrically coupled to the cathode material and cooperating with the substrate to enclose each cell, in the set of cells, to form a multi-cell assembly; and wherein the multi-cell assembly is dividable along walls between adjacent cells, in the set of cells, to form a set of discrete batteries.

2. The battery system of claim 1:
wherein the substrate comprises a mono-crystal silicon wafer; and
wherein a first fin, in the set of fins, in a particular cell in the set of cells:
extends upwardly from a base of the particular cell; and
defines a rectilinear cross-section; and
comprises a first set of parallel faces perpendicular to the base of the particular cell and parallel to a {110} plane of a crystalline structure of the substrate.

3. The battery system of claim 2, wherein the first fin in the particular cell further comprises a second set of parallel faces perpendicular to the base of the particular cell, perpendicular to the first set of parallel faces, and parallel to a second {110} plane of the crystalline structure of the substrate.

4. The battery system of claim 2, wherein the first fin in the particular cell:
defines a principle axis parallel to a long axis of the particular cell and parallel to the {110} plane of the crystalline structure of the substrate; and
is segmented along the principle axis.

5. The battery system of claim 4, wherein the first fin in the particular cell:
extends approximately 500 microns above the base of the particular cell; and
is segmented at intervals of approximately 1000 microns along the principle axis.

6. The battery system of claim 1, wherein the electrolyte material:
comprises a monomer, a polymer, and a photocatalyst deposited into each cell in the set of cells;
is selectively exposed to electromagnetic radiation to selectively activate the photocatalyst to selectively form cured monomer adjacent vertical surfaces in each cell in the set of cells;
is exposed to solvent that dissolves and removes the polymer from cured monomer to form open-celled pores within the cured monomer adjacent vertical surfaces in each cell in the set of cells; and
is configured to transport lithium ions between the cathode material and fins in each cell in the set of cells through open-celled pores within the cured monomer.

7. The battery system of claim 1, wherein the cathode material comprises:
a first proportion of lithium-storing material;
a second proportion of carbon less than the first proportion;
a third proportion of binder less than the second proportion; and
a volume of solvent configured to carry lithium ions into pores in the electrolyte.

8. The battery system of claim 1 wherein the cathode material extends up to an inside edge of the wall of each cell in the set of cells.

9. The battery system of claim 1:
further comprising a seal sealing the cathode current collector to a top of the continuous wall of each cell in the multi-cell assembly;
wherein the seal is applied over the passivated material arranged along tops of the wall encircling each cell in the set of cells; and
wherein the cathode current collector comprises a conductive structure bonded to the seal around each cell in the set of cells and extends continuously across each cell in the set of cells.

10. The battery system of claim 1, wherein a particular battery, in the set of discrete batteries, comprises:
a segment of the substrate
a segment of the cathode current collector;
a first electrical lead coupled to the segment of the substrate opposite the segment of the cathode current collector and a second electrical lead coupled to the segment of the cathode current collector opposite the segment of the substrate following separation of the particular battery from the multi-cell assembly; and
a packaging material encasing the segment of the substrate and the segment of the cathode current collector in a surface-mount technology format, the first electrical lead and the second electrical lead passing through the packaging material.

11. The battery system of claim 1:
wherein the substrate defines the set of cells comprising:
a first cell defining a first base of a first cell geometry and bounded by a first wall; and
a second cell adjacent the first cell, defining a second base of a second cell geometry different from the first cell geometry, and bounded by a second wall;
wherein the electrolyte material comprises:
a first volume of electrolyte material coating vertical surfaces within the first cell; and
a second volume of electrolyte material coating vertical surfaces within the second cell;
wherein the cathode material comprises:
a first volume of the cathode material arranged in the first cell over the first volume of electrolyte material; and
a second volume of the cathode material arranged in the second cell over the second volume of electrolyte material and physically isolated from the volume of the cathode material;
wherein the cathode current collector is arranged over the first cell and the second cell and extends continuously over the first volume of the cathode material and the second volume of the cathode material; and
wherein the substrate and the cathode current collector of the multi-cell assembly are dividable between adjacent segments of the first wall and the second wall to form a first discrete battery of a first battery geometry and a second discrete battery of a second battery geometry different from the first battery geometry.

12. The battery system of claim 11, wherein, following separation from the multi-cell assembly, the first discrete battery and the second discrete battery are electrically coupled and encased in a packaging material to form a discrete multi-cell battery unit.

13. A battery unit comprising:
a substrate defining a cell comprising:
a base;
a wall encompassing the base; and
a set of fins extending from the base;
an electrolyte material coating surfaces within the cell;

a passivated material located across horizontal surfaces within the cell;

a cathode material arranged in the cell over the electrolyte material, over the passivated material, between fins in the set of fins, and between the set of fins and the wall; and a cathode current collector arranged over the wall, electrically coupled to the cathode material, and cooperating with the substrate to enclose the cell.

14. The battery unit of claim 13:

wherein the substrate comprises a segment of a mono-crystal silicon wafer; and wherein a first fin, in the set of fins in the cell:
extends upwardly from the base of the cell;
defines a rectilinear cross-section; and
comprises a first set of parallel faces perpendicular to the base of the cell and parallel to a {110} plane of a crystalline structure of the substrate.

15. The battery unit of claim 14, wherein the first fin in the particular cell further comprises a second set of parallel faces perpendicular to the base of the particular cell, perpendicular to the first set of parallel faces, and parallel to a second {110} plane of the crystalline structure of the substrate.

16. The battery unit of claim 14, wherein a second fin, in the set of fins in the cell:

extends upwardly from the base of the cell; and
comprises a second set of parallel faces perpendicular to the base of the cell, parallel to the {110} plane of a crystalline structure of the substrate, and parallel and offset from the first set of parallel faces of the first fin.

17. The battery unit of claim 13:

wherein the cathode current collector cooperates with the substrate to enclose the cell to form a battery; and further comprising:
a charging circuit arranged adjacent the substrate; and
a packaging material encasing the battery and the charging circuit.

18. The battery unit of claim 13, wherein the passivated material comprises a dielectric material:

located across the base of the cell and tops of the fins in the set of fins; and configured to inhibit conduction of ions and electrons between the substrate and the electrolyte material via the base of the cell and tops of the fins in the set of fins.

19. The battery unit of claim 13, wherein the passivated material:

comprises a dielectric material characterized by permeability to lithium ions less than permeability of the electrolyte material to lithium ions; and defines a layer of the dielectric material approximately 200-nanometers in thickness across the base of the cell.

20. The battery unit of claim 13:

wherein the substrate comprises a segment of a mono-crystal silicon wafer; and wherein the passivated material comprises a silicon oxide layer selectively converted across horizontal surfaces of the mono-crystal silicon wafer within the cell, the silicon oxide layer inhibiting conduction of ions and electrons between the substrate and the electrolyte material via horizontal surfaces within the cell.

* * * * *